United States Patent [19]
Hugo et al.

[11] Patent Number: 5,526,976
[45] Date of Patent: Jun. 18, 1996

[54] METHOD OF MANUFACTURING A CONTAINER FOR HOLDING PRESSURIZED FLUIDS

[76] Inventors: Ross Hugo, Box 34, Site 201, R.R. #2, New Sarepta, Alberta, Canada, T0B 3M0; Colin C. Harcourt, 9534 - 90 Street, Edmonton, Alberta, Canada, T6C 3M5

[21] Appl. No.: 304,932

[22] Filed: Sep. 13, 1994

[51] Int. Cl.⁶ .................................................. B23K 31/02
[52] U.S. Cl. .......................................... 228/184; 228/164
[58] Field of Search ................................ 228/164, 168, 228/169, 170, 184, 60

[56] References Cited

U.S. PATENT DOCUMENTS

| | | | |
|---|---|---|---|
| 3,980,220 | 9/1976 | Wolfe et al. | 228/184 |
| 4,178,966 | 12/1979 | Savor et al. | 228/60 |
| 4,386,728 | 6/1983 | Torok et al. | 228/184 |
| 4,916,284 | 4/1990 | Petrick | 219/121.64 |
| 5,135,705 | 8/1992 | Gooch, IV et al. | 228/60 |

FOREIGN PATENT DOCUMENTS

| | | | |
|---|---|---|---|
| 466256 | 5/1937 | United Kingdom | 228/184 |

*Primary Examiner*—Samuel M. Heinrich
*Attorney, Agent, or Firm*—Anthony R. Lambert

[57] ABSTRACT

A method of manufacturing a container for holding pressurized fluids is described. Firstly, drill a first axial blind bore into a first end of a first piece of bar stock. Secondly, drill a second axial blind bore into a first end of a second piece of bar stock. Thirdly, weld the first end of the first piece of bar stock to the first end of the second piece of bar stock. This forms a container in which the first axial blind bore and the second axial blind bore cumulatively form an interior cavity. Following the teachings of the described method gas cylinders have been manufactured that can withstand pressure levels of 1800 pounds per square inch.

4 Claims, 2 Drawing Sheets

5,526,976

METHOD OF MANUFACTURING A CONTAINER FOR HOLDING PRESSURIZED FLUIDS

The present invention relates to a method of manufacturing a container for holding pressurized fluids.

BACKGROUND OF THE INVENTION

Cylindrical aluminum containers are commonly used to hold samples of pressurized gas. These containers have come to be generally referred to as "gas cylinders". Gas cylinders are usually formed through an extrusion molding process. As pressure requirements increase, it becomes more difficult to produce a cylinder with sufficiently thick side and end walls to withstand specified burst pressures.

The Applicant attempted to manufacture a thick walled aluminum gas cylinder by welding end caps onto aluminum pipe. This alternative method of manufacturing a gas cylinder also failed to withstand specified burst pressures. It became apparent that an alternative approach was required.

SUMMARY OF THE INVENTION

What is required is a method of manufacturing a container for holding pressurized fluids that can withstand higher burst pressures.

According to the present invention there is provided a method of manufacturing a container for holding pressurized fluids. Firstly, drill a first axial blind bore into a first end of a first piece of bar stock. Secondly, drill a second axial blind bore into a first end of a second piece of bar stock. Thirdly, weld the first end of the first piece of bar stock to the first end of the second piece of bar stock. This forms a container in which the first axial blind bore and the second axial blind bore cumulatively form an interior cavity.

Following the teachings of the present method the Applicant's have been successful in manufacturing gas cylinders that can withstand higher pressure levels than is possible with the other methods of manufacture described above. For example, a gas cylinder has been developed that can withstand pressures of up to 1800 pounds per square inch. To withstand such pressures of up to 1800 pounds per square inch a minimum side and end wall thickness of 6 mm is provided. The first piece of bar stock and the second piece of bar stock are welded together using a T.I.G. welding process. Using the described method, it is possible to manufacture gas cylinders that can withstand pressures much greater than 1800 pounds per square inch to suit particular industrial applications.

According to another aspect of the present invention there is provided a container for holding pressurized fluids which is comprised of a first piece of bar stock having a first end with a first axial blind bore. A second piece of bar stock is provided having a first end with a second axial blind bore. The first end of the first piece of bar stock is welded to the first end of the second piece of bar stock thereby forming a container in which the first axial blind bore and the second axial blind bore cumulatively form an interior cavity. At least one access opening is provided into the interior cavity.

BRIEF DESCRIPTION OF THE DRAWINGS

These and other features of the invention will become more apparent from the following description in which reference is made to the appended drawings, wherein.

DETAILED DESCRIPTION OF THE PREFERRED EMBODIMENT

Figure 2:
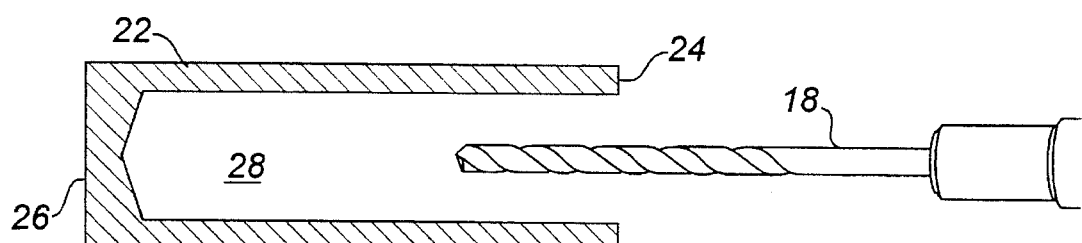
FIG. 2 is a side elevation view in longitudinal section of a second step in the described method.
Figure 3:
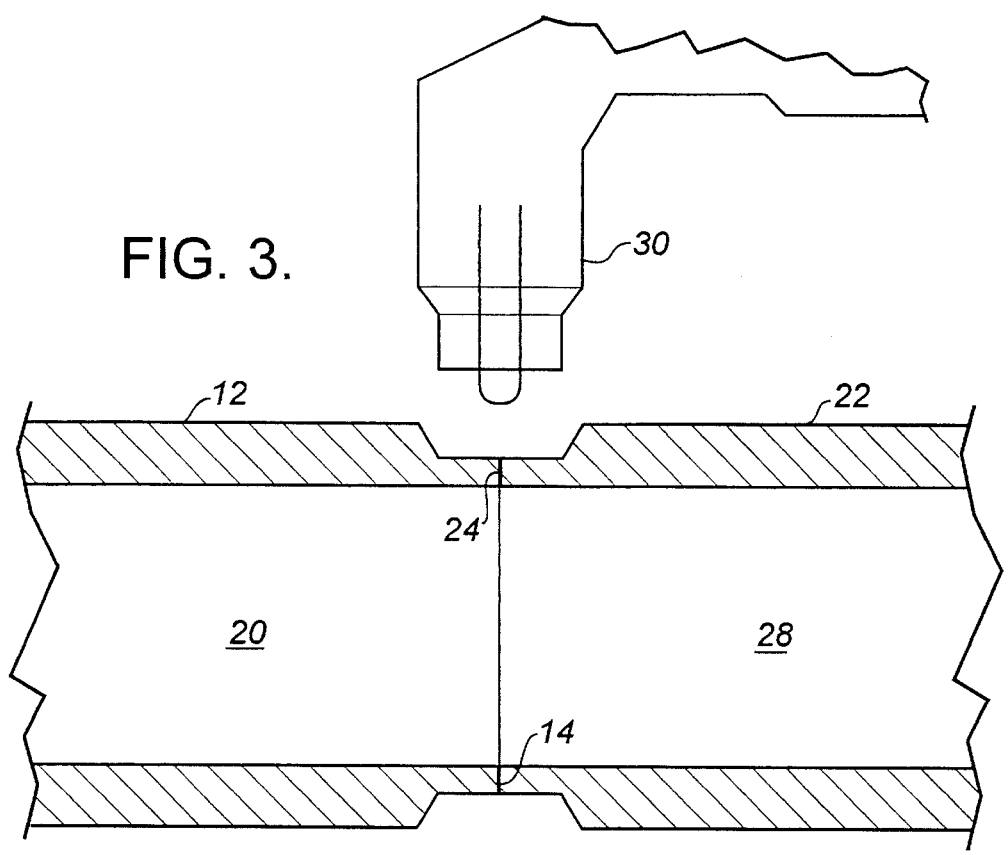
FIG. 3 is a side elevation view in longitudinal section of a third step in the described method.

The preferred method of manufacturing a container for holding pressurized fluids will now be described with reference to FIGS. 1 through 3.

Figure 1:
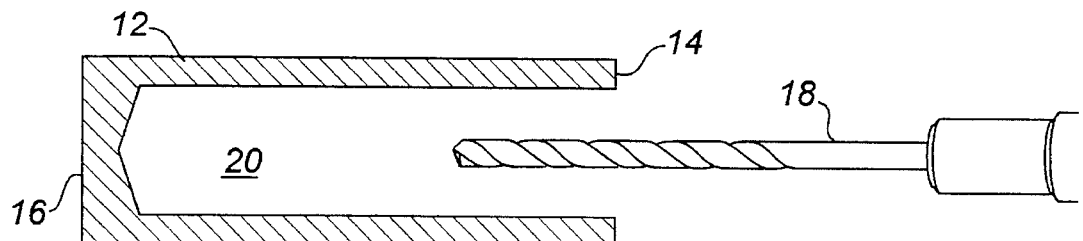
FIG. 1 is a side elevation view in longitudinal section of a first step in the described method.
Figure 4:
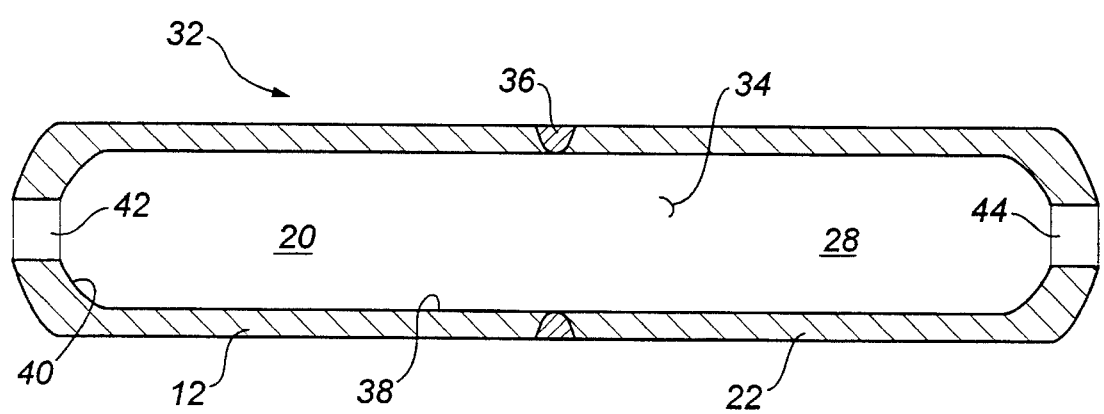
FIG. 4 is a side elevation view in longitudinal section of a container for holding pressurized fluids constructed in accordance with the teachings of the present invention.

Referring to FIG. 1, a first piece of cylindrical aluminum bar stock 12 is provided having a first end 14 and a second end 16. A first step involves using a drill 18 to drill a first axial blind bore 20 into first end 14 of first piece of cylindrical aluminum bar stock 12. Referring to FIG. 2, a second piece of cylindrical aluminum bar stock 22 is provided having a first end 24 and a second end 26. A second step involves using drill 18 to drill a second axial blind bore 28 into first end 24 of second piece of cylindrical aluminum bar stock 22. Referring to FIG. 3, a third step involves using T.I.G. welding torch 30 to weld first end 14 of first piece of cylindrical aluminum bar stock 12 to first end 24 of second piece of cylindrical aluminum bar stock 22. Referring to FIG. 4, this forms a generally cylindrical container (a gas cylinder) 32 in which first axial blind bore 20 and second axial blind bore 28 cumulatively form an interior cavity; identified by reference numeral 34. The weld formed through the use of welding torch 30 is identified by reference numeral 36. The side walls of gas cylinder 32 are identified by reference numeral 38. The end walls of gas cylinder 32 are identified by reference numeral 40.

It should be noted that a major advantage of this method is that it enables gas cylinder 32 to be manufactured with thicker side walls 38 and end walls 40. It should also be noted that great care must be taken in the preparation and completion of weld 36 in accordance with established practices for T.I.G. welding. Following the teachings of this method gas cylinders 32 may be custom manufactured to meet pressure applications that were formerly not possible. Some engineering input is required to determine the wall thickness required to meet specified pressures for a given industrial application. For example, with pressures of up to 1800 pounds per square inch a minimum side and end wall thickness of 6 mm is preferred. Of course, at least one access opening must be provided to allow gas to communicate with interior cavity 34. In some applications only one access opening is required. In other application two access openings is required. FIG. 4 illustrates gas cylinder 32 as having two opposed access openings 42 and 44.

Referring to FIG. 4, another aspect of the present invention is cylindrical aluminum container for holding pressurized fluids, previously referred to as gas cylinder 32. Gas cylinder 32 which results from the teachings of the above described method is visibly and identifiably different from gas cylinders manufactured through other methods. Gas cylinder 32 consist of first piece of cylindrical aluminum bar stock 12 having first end 14 with first axial blind bore 20 and second piece of cylindrical aluminum bar stock 22 having first end 24 with second axial blind bore 28. First end 14 of first piece of cylindrical aluminum bar stock 12 is welded at weld 36 to first end 24 of second piece of cylindrical aluminum bar stock 22. This forms generally cylindrical container (gas cylinder 32) in which first axial blind bore 20 and second axial blind bore 28 cumulatively form interior cavity 34. At least one access opening (42 or 44) is provided into interior cavity 34.

The method, as described, provides further advantages that will now be described. Gas cylinder 32 does not require post weld heat treatment, as is the case when end caps are welded onto aluminum pipe. The method provides a flexibility to select a desired thread type for access openings 42 and 44, which is not possible through extrusion forming methods. With extrusion forming methods threads are usually positioned within a thin walled sleeve. The walls of the sleeve tend to expand outwardly over prolonged use which adversely effects the holding ability of the threads. This expansion over time simply does not occur with gas cylinder 32 as access openings 42 and 44 extend are positioned in end wall 40 which is as thick as the rest of gas cylinder 32.

It will be apparent to one skilled in the art that, although cylindrical bar stock is commonly used, the bar stock formed in other configurations can be used. It will also be apparent to one skilled in the art that although this method was developed to address problems with aluminum gas cylinders, the method could be used with cylinders of other materials. It will be apparent to one familiar with welding procedures that is far preferable that the selected number of access openings be made prior to the welding step. The reason for this is that the access opening accommodates the expansion of gases that inevitably occurs during welding. It will finally be apparent to one skilled in the art that modifications may be made to the illustrated embodiment without departing from the spirit and scope of the invention as defined by the claims.

The embodiments of the invention in which an exclusive property or privilege is claimed are as follows:

1. A method of manufacturing a container for holding pressurized fluids, comprising the steps of:
   Firstly, drilling a first axial blind bore into a first end of a first piece of unitary bar stock;
   Secondly, drilling a second axial blind bore into a first end of a second piece of unitary bar stock;
   Thirdly, fusion welding the first end of the first piece of bar stock to the first end of the second piece of bar stock thereby forming a container in which the first axial blind bore and the second axial blind bore cumulatively form an interior cavity.

2. The method of manufacturing a container for holding pressurized fluids as defined in claim 1, wherein the bar stock is aluminum.

3. The method of manufacturing a container for holding pressurized fluids as defined in claim 1, wherein the bar stock is cylindrical.

4. A method of manufacturing a cylindrical aluminum container for holding pressurized fluids, comprising the steps of:
   Firstly, drilling a first axial blind bore into a first end of a first piece of unitary cylindrical aluminum bar stock;
   Secondly, drilling a second axial blind bore into a first end of a second piece of unitary cylindrical aluminum bar stock;
   Thirdly, drilling at least one access opening communicating with one of the first axial blind bore and the second axial blind bore;
   Fourthly, fusion welding the first end of the first piece of cylindrical aluminum bar stock to the first end of the second piece of cylindrical aluminum bar stock thereby forming a generally cylindrical container in which the first axial blind bore and the second axial blind bore cumulatively form an interior cavity.

* * * * *